Patented Sept. 5, 1922.

1,428,217

UNITED STATES PATENT OFFICE.

ALEXANDER CLASSEN, OF AACHEN, GERMANY, ASSIGNOR, BY MESNE ASSIGNMENTS, TO THE CHEMICAL FOUNDATION, INC., A CORPORATION OF DELAWARE.

PROCESS FOR OBTAINING SUGARS FROM SUBSTANCES CONTAINING CELLULOSE.

No Drawing. Application filed June 21, 1919. Serial No. 305,942.

*To all whom it may concern:*

Be it known that I, ALEXANDER CLASSEN, a German subject, and resident of Aachen, Germany, have invented certain new and useful Improvements in a Process of Obtaining Sugars from Substances Containing Cellulose (for which applications have been filed in Germany May 23, 1917, first addition February 12, 1918, second addition January 13, 1919; in Switzerland February 25, 1919; in Sweden March 1, 1919; in Denmark March 7, 1919; in Norway March 18, 1919; and in Holland March 20, 1919), of which the following is a specification.

My present invention relates to a process of obtaining furfurol as well as glucose from substances containing cellulose, its object being to provide improvements in such processes whereby a considerably higher yield of sugar and furfurol is obtained. Owing to my novel improvements I am able to produce sugar solutions which are of an exceptional fermenting quality.

Hitherto it has been proposed to convert wood and other cellulose containing substances into sugar by subjecting such substances, in the presence of an acid, to the action of heat and a suitable steam pressure, and to obtain alcohol (ethylalcohol) from the thus produced sugar solution by fermentation. It has been proposed to employ for this purpose sulphuric acid, hydrochloric acid and sulphurous acid. Moreover, it has been proposed to employ a mixture of several acids for the purpose of transforming wood into sugar. Although such proposals have been made previously, there have never become known any details as to the exact composition of such mixtures of acids, or wherever such mixtures have been specified the same proved to have no technical advantages over the employment of a single acid and in some instances such specified mixtures involved even disadvantages. However, all those processes which have been proposed involve the drawback that there is obtained only a comparatively small yield of sugar and the mash obtained in consequence of the decomposition of the wood has the tendency to resist fermentation. Hitherto no process has become known which in addition to glucose yields furfurol and methyl alcohol in quantities commercially important.

I have discovered that quite surprising results may be obtained by employing hydrochloric acid or sulphuric acid for, what I call, the conversion acid, that is, for the sole purpose of converting the cellulose containing substances into a sugar containing mash, and adding to the so called conversion acid another acid, or a plurality of acids, which I have found to act as a catalyzer and in consequence need be present only in quantities which are small in comparison to the quantity of conversion acid required. The quantity of conversion acid required is determined in accordance with the quantity of raw material being treated. I have found, for instance, that I may employ hydrochloric acid as the conversion acid and sulphuric acid, or sulphurous acid, or hydrofluoric acid, or a mixture of such acids as the catalytically acting addition acid or acids. If employing sulphuric acid as the conversion acid I may use hydrochloric acid, sulphurous acid, or other inorganic acids as acids of addition. It appears that sulphurous acid cannot be employed as the conversion acid but is useful only as the acid of addition. Instead of the acids I may employ as catalyzers salts which give an acid reaction such, for instance, as the bisulphates and bisulphites. Moreover, I may use, as addition substances, salts which are decomposed by an excess of acid or which under proper conditions are hydrolytically decomposed as, for instance, the chlorids of magnesium, calcium, aluminium, zinc, and manganese.

In accordance with my present invention considerably higher yields of fermentable sugar are obtained while simultaneously I am able to obtain a sugar mash which readily undergoes fermentation. Although it has been proposed before my invention to use mixtures of various acids instead of a single conversion acid, my present invention, is distinguished from any such proposal by the feature that I do not replace a single acid by a mixture of acids for I still employ a suitable acid in required quantity for the conversion of the cellulose containing substances into a sugar containing mash. In addition thereto I employ catalytic agents in the form of a single acid or a plurality of acids, and I believe that it is owing to the presence of such catalytic agents that I am able to obtain the favorable results which are described above.

Moreover, I have discovered that the proportion of the quantity of liquids (acids and water) to the quantity of wood to be treated is essential with regard to the result of the process. It is especially desirable not to use too small a quantity of liquid since in such a case non-fermentable substances are formed in lieu of fermentable sugars. If hydrochloric acid is being used as the converson acid it is, for instance, preferable to add a quantity of water which is less than the quantity of wood treated, but more than one half thereof. Of course, the water content of the wood to be treated must be considered in determining the quantity of the conversion acid. As especially favorable to the formation of furfurol I prefer to carry my invention into effect by converting a suitable wood product as, for instance, sawdust, or other substances containing pentosane or pentosene, by means of hydrochloric acid or sulphuric acid, and add thereto at least two catalytically acting acids of which one exceeds the other with regard to its quantity. When employing hydrochloric acid as the conversion acid I prefer to use sulphuric acid and sulphurous acid as the addition acids. In connection with sulphuric acid as the conversion acid I prefer to use hydrochloric acid and sulphurous acid as the addition acids.

I have above indicated that furfurol is formed when wood and the like is converted into a sugar containing mash and subjected to fermentation. However, the proportion of furfurol thus formed is far below 0.5 per cent determined relative to the dry weight of wood treated. When working in accordance with my present invention and employing saw-dust from pine wood there may be obtained two to three per cent of furfurol and considerable quantities of methyl-alcohol. This high yield renders the process altogether very profitable. Although it is a well known fact that large quantities of furfurol may be obtained by subjecting hard wood, for instance, beech-wood, to heat in the presence of concentrated hydrochloric acid (an acid of, for instance twelve per cent), it is nevertheless impossible to obtain at the same time fermentable sugar in any quantity, worth mentioning, since under the combined action of heat and a concentrated acid the fermentable sugars which are temporarily formed are quickly converted.

I may also carry my invention into effect by employing, besides catalytically acting acids of addition, special protective substances, especially metals or metallic exides as, for instance, ironoxide, chromium-oxide, manganese-oxide, and so on, whereby I am able to employ steam of a lesser pressure than is otherwise required for the obtention of good yields of sugar; as a matter of course, with my invention, the final yield is not affected by the reduced pressure.

Moreover, I have discovered that it is advantageous to cool the reaction product as quickly as possible after the completion of the conversion. I may obtain the cooling effect by evacuating the conversion vessel after having removed the gas and steam therefrom; or I may pass air or another suitable gaseous cooling agent through the contents of the vessel either by suction or pressure. The cooling effect has a favorable influence with regard to both the yield of sugar, which is increased, and the fermenting quality of the mash which is improved thereby. In order to avoid loss of furfurol and other products it is necessary to have this after-treatment follow the conversion directly.

In carrying the invention into effect I prefer to employ a revoluble autoclave which I first charge with saw-dust or other suitable substances containing cellulose and to which I add a certain quantity of liquid. I then subject the contents of the vessel to the action of pressure steam for a short period as a prior steaming treatment. After having removed the vapour and steam formed I introduce the acids required in any suitable manner. In this connection it is to be observed that the conversion acid must be present in a quantity which is sufficient to completely convert the quantity of raw material being treated. This quantity may be determined through prior tests which are comparatively simple on account of the fact that if a sufficient quantity of acid has been employed the result of the action of the conversion acid is a product which can be readily disintegrated by grinding and does not contain any hard constituents, whereas the conversion acid will not have entirely destroyed the natural structure of the wood if the quantity of acid employed was insufficient. After the acid required has been added the pressure of the steam is gradually increased to from seven or eight atmospheres. On completion of the conversion process the gaseous content is blown into a cooling apparatus in which the furfurol is condensed in conjunction with other gaseous products. For the obtainment of the small quantities of furfurol still present in the cellulose residues I prefer to introduce steam into the autoclave for a second time and remove the furfurol by suction. The thus drawn off gases and vapours are likewise passed through a cooling apparatus in which the furfurol is condensed. The residue of the re-action is then removed and the sugar obtained by lixiviation.

*Examples.*

1. 1000 kilograms of dry fir or pine sawdust are mixed with 880 liters of water, thereto are added 10 kilograms of water-free hydrochloric acid (in form of acid of 33 per cent, a corresponding quantity) 1.98 kilograms of water-free sulphuric acid (employed as sulphuric acid of a specific weight equal to about 1.04 to 1.21), and one kilogram of $SO_2$. The mixture is heated to from 160 to 170 degrees centigrade. The yield is 36.5% of substances reducible by Fehling's solution, from which on a commercial scale are obtained 12 liters and over of alcohol calculated on a basis of 100% alcohol, as well as 2.2% of furfurol.

2. 1000 kilograms of dry fir or pine sawdust are mixed with 800 liters of water, and 12.4 kilograms of water-free sulphuric acid (employed in a corresponding quantity as acid of a specific weight from 1.04 to 1.21) and 60 grams of $SO_2$ added thereto, whereupon the mass is heated to from 160 to 170 degrees centigrade. The yield is 36.2% of substances reducible by Fehling's solution from which are obtained on a commercial scale 12 liters and over of alcohol calculated on a basis of 100% alcohol, as well as 2.2% of furfurol.

What I claim as my invention and desire to secure by Letters Patent of the United States, is:—

1. A process for converting cellulose-containing substances into sugar which consists in mixing about 1000 parts of cellulose-containing material with about 880 parts of water, about 10 parts hydrogen chloride, about 2 parts hydrogen sulphate, and 1 part sulphur dioxide, and then heating.

2. A process for converting cellulose-containing substances into sugar which consists in mixing about 1000 parts of cellulose-containing material with about 880 parts of water, about 10 parts hydrogen chloride, about 2 parts hydrogen sulphate, and 1 part sulphur dioxide, and then heating to about 160°–170° C.

3. A process for converting cellulose-containing substances into sugar which consists in mixing about 1000 parts of cellulose-containing material with about 880 parts of water, about 10 parts hydrogen chloride (as 33% hydrochloric acid), about 2 parts hydrogen sulphate (as sulphuric acid of about 1.12 sp. gr.), and 1 part sulphur dioxide, and then heating to about 160°–170° C.

4. A process for converting cellulose-containing substances into sugar which consists in mixing about 1000 parts of sawdust with about 880 parts of water, about 10 parts hydrogen chloride (as 33% hydrochloric acid), about 2 parts hydrogen sulphate (as sulphuric acid of about 1.12 sp. gr.), and 1 part sulphur dioxide, and then heating to about 160°–170° C.

5. A process for converting cellulose-containing substances into sugar which consists in mixing cellulose-containing material with water, about 1% (based on the actual weight of the cellulose) of hydrogen chloride, and about .2% of hydrogen sulphate and heating to a temperature of about 150° C.

6. A process for converting cellulose-containing substances into sugar which consists in mixing cellulose-containing material with water, 1% (based on the actual weight of the cellulose) of hydrogen chloride, and about .2% of hydrogen sulphate and heating to a temperature of about 150° C.

7. A process for converting cellulose-containing substances into sugar which consists in mixing cellulose-containing material with water, 1% (based on the actual weight of the cellulose) of hydrogen chloride, about .2% of hydrogen sulphate, and about .1% sulphur dioxide and heating to a temperature of about 150° C.

8. A process for converting cellulose-containing substances into sugar which consists in mixing cellulose-containing material with about 88% (based on the actual weight of the cellulose) of water, about 1% hydrogen chloride, about .2% hydrogen sulphate, and about .1% sulphur dioxide, and heating the mixture to a temperature of about 150° C.

In testimony whereof I have signed my name to this specification in the presence of two subscribing witnesses.

Dr. ALEXANDER CLASSEN.

Witnesses:
Lymons Heintzmann,
Willi Kübler.